United States Patent
Nomura et al.

(10) Patent No.: US 11,757,788 B2
(45) Date of Patent: Sep. 12, 2023

(54) SIGNAL TRANSFER SYSTEM, SIGNAL TRANSFER DEVICE, SIGNAL TRANSFER METHOD AND SIGNAL TRANSFER PROGRAM

(71) Applicant: NIPPON TELEGRAPH AND TELEPHONE CORPORATION, Tokyo (JP)

(72) Inventors: Hiroko Nomura, Musashino (JP); Naotaka Shibata, Musashino (JP); Keita Takahashi, Musashino (JP); Tomoya Hatano, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/910,277

(22) PCT Filed: Mar. 9, 2020

(86) PCT No.: PCT/JP2020/010094
§ 371 (c)(1),
(2) Date: Sep. 8, 2022

(87) PCT Pub. No.: WO2021/181478
PCT Pub. Date: Sep. 16, 2021

(65) Prior Publication Data
US 2023/0120429 A1    Apr. 20, 2023

(51) Int. Cl.
*H04L 47/62* (2022.01)
*H04L 47/6275* (2022.01)

(52) U.S. Cl.
CPC ...... *H04L 47/6215* (2013.01); *H04L 47/6275* (2013.01)

(58) Field of Classification Search
None
See application file for complete search history.

(56) References Cited

U.S. PATENT DOCUMENTS 8,881,165 B2 * 11/2014 Chambliss ............ G06F 3/0659
718/103
2021/0075675 A1 * 3/2021 Cavalcanti .......... H04L 41/0823
(Continued)

OTHER PUBLICATIONS

LAN/MAN Standards Committee of the IEEE Computer Society, Time-Sensitive Networking for Fronthaul, IEEE Std 802.1CM-2018, IEEE Standard for Local and metropolitan area networks-, Jun. 8, 2018.

*Primary Examiner* — Benjamin Lamont
(74) *Attorney, Agent, or Firm* — Harness, Dickey & Pierce, P.L.C.

(57) ABSTRACT

In a signal transfer system including a signal transfer management apparatus and a plurality of signal transfer apparatuses connected in multiple stages and forming a network between a distribution station apparatus and a central station apparatus, a signal transfer apparatus on an upper side among the plurality of signal transfer apparatuses transmits a timing adjustment request to at least one of a plurality of signal transfer apparatuses on a lower side among the plurality of signal transfer apparatuses upon determining that there is a possibility that a microburst occurs according to mobile scheduling information received from the plurality of signal transfer apparatuses on the lower side, and the signal transfer apparatus on the lower side that has received the timing adjustment request from the signal transfer apparatus on the upper side adjusts opening and closing timings of a gate based on the timing adjustment request. This can prevent the occurrence of a microburst.

7 Claims, 4 Drawing Sheets

(56) References Cited

U.S. PATENT DOCUMENTS

| | | | |
|---|---|---|---|
| 2021/0226843 A1* | 7/2021 | Bhaduri | H04L 47/32 |
| 2022/0021624 A1* | 1/2022 | Sachs | H04L 47/28 |
| 2022/0046462 A1* | 2/2022 | De Andrade Jardim | H04L 47/283 |
| 2022/0061063 A1* | 2/2022 | Patel | H04W 28/0268 |

* cited by examiner

SIGNAL TRANSFER SYSTEM, SIGNAL TRANSFER DEVICE, SIGNAL TRANSFER METHOD AND SIGNAL TRANSFER PROGRAM

CROSS-REFERENCE TO RELATED APPLICATIONS

This application is a 371 U.S. National Phase of International Application No. PCT/JP2020/010094, filed on Mar. 9, 2020. The entire disclosure of the above application is incorporated herein by reference.

TECHNICAL FIELD

The present invention relates to a signal transfer technique that uses a time aware shaper (TAS) function.

BACKGROUND ART

Networks that make up a cellular system include those of mobile fronthaul (MFH) and mobile backhaul (MBH). MBH is a network between distribution station apparatuses corresponding to base stations and a centralized station that controls the distribution station apparatuses. On the other hand, MFH corresponds to the section between a wireless control apparatus and wireless apparatuses when a base station is configured with its components deployed separately over the wireless control apparatus and the wireless apparatuses. In the related art, point-to-point connections have been used for this section, while implementation of a network with a configuration in which layer-2 switches are connected in multiple stages has also been considered (see NPL 1), which achieves efficient accommodation compared to point-to-point connections. In such networks, it is necessary to satisfy strict delay requirements, and in order to reduce the delay of high priority signals, it has been proposed that each signal transfer apparatus be equipped with a TAS function.

Hereinafter, the present invention will be described with reference to MBH as an example, but can also be applied to MFH by replacing distribution station apparatuses with wireless apparatuses and a central station apparatus with a wireless control apparatus.

CITATION LIST

Non Patent Literature

NPL 1: "Time-Sensitive Networking for Fronthaul," IEEE Std P802. 1CM, May 7, 2018

SUMMARY OF THE INVENTION

Technical Problem

The TAS reserves a time slot for a high priority signal and opens a gate in the reserved time slot to transfer the signal while closing gates of other priority signals, such that high priority signals are transferred preferentially. However, simultaneously with the completion of transmission of a signal that is desired to be prioritized in control, the gate of a signal of another priority is opened and therefore if this occurs simultaneously at signal transfer apparatuses at multiple locations, signals of other priorities will simultaneously arrive at a signal transfer apparatus at the next stage where signals of a plurality of signal transfer apparatuses merge, such that there is a possibility that a microburst may occur. Similarly, at the time of occurrence of transmission of a signal that is desired to be prioritized in control, the gate of the signal that is desired to be prioritized is opened, but if this occurs simultaneously at signal transfer apparatuses at multiple locations, signals that are desired to be prioritized will simultaneously arrive at a signal transfer apparatus at the next stage where signals of a plurality of signal transfer apparatuses merge, such that there is a possibility that a microburst may occur.

Thus, in the MBH network, when gates are opened and closed simultaneously at a plurality of signal transfer apparatuses on the lower side, their signals will merge at a signal transfer apparatus on the upper side, such that a microburst occurs, causing a problem that signal delays and losses occur.

It is an object of the present invention to provide a signal transfer system, a signal transfer apparatus, a signal transfer method, and a signal transfer program wherein, upon determining that there is a possibility that a microburst may occur according to mobile scheduling information received from a plurality of signal transfer apparatuses on the lower side, a signal transfer apparatus on the upper side instructs signal transfer apparatuses on the lower side to adjust the opening timings of gates, whereby it is possible to prevent the occurrence of a microburst.

Means for Solving the Problem

The present invention provides a signal transfer system including a distribution station apparatus corresponding to a wireless base station apparatus, a central station apparatus that centrally controls the wireless base station apparatus, a plurality of signal transfer apparatuses connected in multiple stages and forming a network between the distribution station apparatus and the central station apparatus, and a signal transfer management apparatus that controls the plurality of signal transfer apparatuses, wherein a signal transfer apparatus on an upper side among the plurality of signal transfer apparatuses transmits a timing adjustment request to at least one of a plurality of signal transfer apparatuses on a lower side among the plurality of signal transfer apparatuses upon determining that there is a possibility that a microburst occurs according to mobile scheduling information received from the plurality of signal transfer apparatuses on the lower side, and the signal transfer apparatus on the lower side that has received the timing adjustment request from the signal transfer apparatus on the upper side adjusts opening and closing timings of a gate based on the timing adjustment request.

The present invention also provides a signal transfer apparatus forming a network between a distribution station apparatus corresponding to a wireless base station apparatus, a central station apparatus that centrally controls the wireless base station apparatus, the distribution station apparatus, and the central station apparatus, the signal transfer apparatus including a signal distribution unit that distributes received signals to priority based buffers, a time gate unit that opens and closes gates for the signals of the buffers according to a command from a scheduler unit, a signal transfer unit that transfers frames output from the gates of the time gate unit to designated output destinations, a calculation unit that, when the signal transfer apparatus is a signal transfer apparatus on an upper side, transmits a timing adjustment request to at least one of a plurality of the signal transfer apparatuses on a lower side upon determining that there is a possibility that a microburst occurs according to mobile scheduling information received from the plurality of signal transfer apparatuses on the lower side, and the scheduler unit that, when the signal transfer apparatus is a signal transfer apparatus on the lower side, adjusts opening and closing timings of the gates based on the timing adjustment request received from the signal transfer apparatus on the upper side.

The present invention also provides a signal transfer method for a signal transfer system including a distribution station apparatus corresponding to a wireless base station apparatus, a central station apparatus that centrally controls the wireless base station apparatus, a plurality of signal transfer apparatuses connected in multiple stages and forming a network between the distribution station apparatus and the central station apparatus, and a signal transfer management apparatus that controls the plurality of signal transfer apparatuses, the signal transfer method including by a signal transfer apparatus on an upper side among the plurality of signal transfer apparatuses, transmitting a timing adjustment request to at least one of a plurality of signal transfer apparatuses on a lower side among the plurality of signal transfer apparatuses upon determining that there is a possibility that a microburst occurs according to mobile scheduling information received from the plurality of signal transfer apparatuses on the lower side, and by the signal transfer apparatus on the lower side that has received the timing adjustment request from the signal transfer apparatus on the upper side, adjusting opening and closing timings of a gate based on the timing adjustment request.

A signal transfer program according to the present invention causes a computer to execute processing performed in the signal transfer method.

Effects of the Invention

The signal transfer system, the signal transfer apparatus, the signal transfer method, and the signal transfer program according to the present invention can prevent the occurrence of a microburst because, upon determining that there is a possibility that a microburst may occur according to mobile scheduling information received from a plurality of signal transfer apparatuses on the lower side, a signal transfer apparatus on the upper side instructs signal transfer apparatuses on the lower side to adjust the opening timings of gates.

DESCRIPTION OF EMBODIMENTS

Hereinafter, an embodiment of a signal transfer system, a signal transfer apparatus, a signal transfer method, and a signal transfer program according to the present invention will be described with reference to the drawings. Each signal transfer apparatus described in the following embodiment corresponds to a network device such as a Layer-2 SWitch (L2SW) and the signal transfer management apparatus manages and controls the operation of signal transfer apparatuses.

Figure 1:
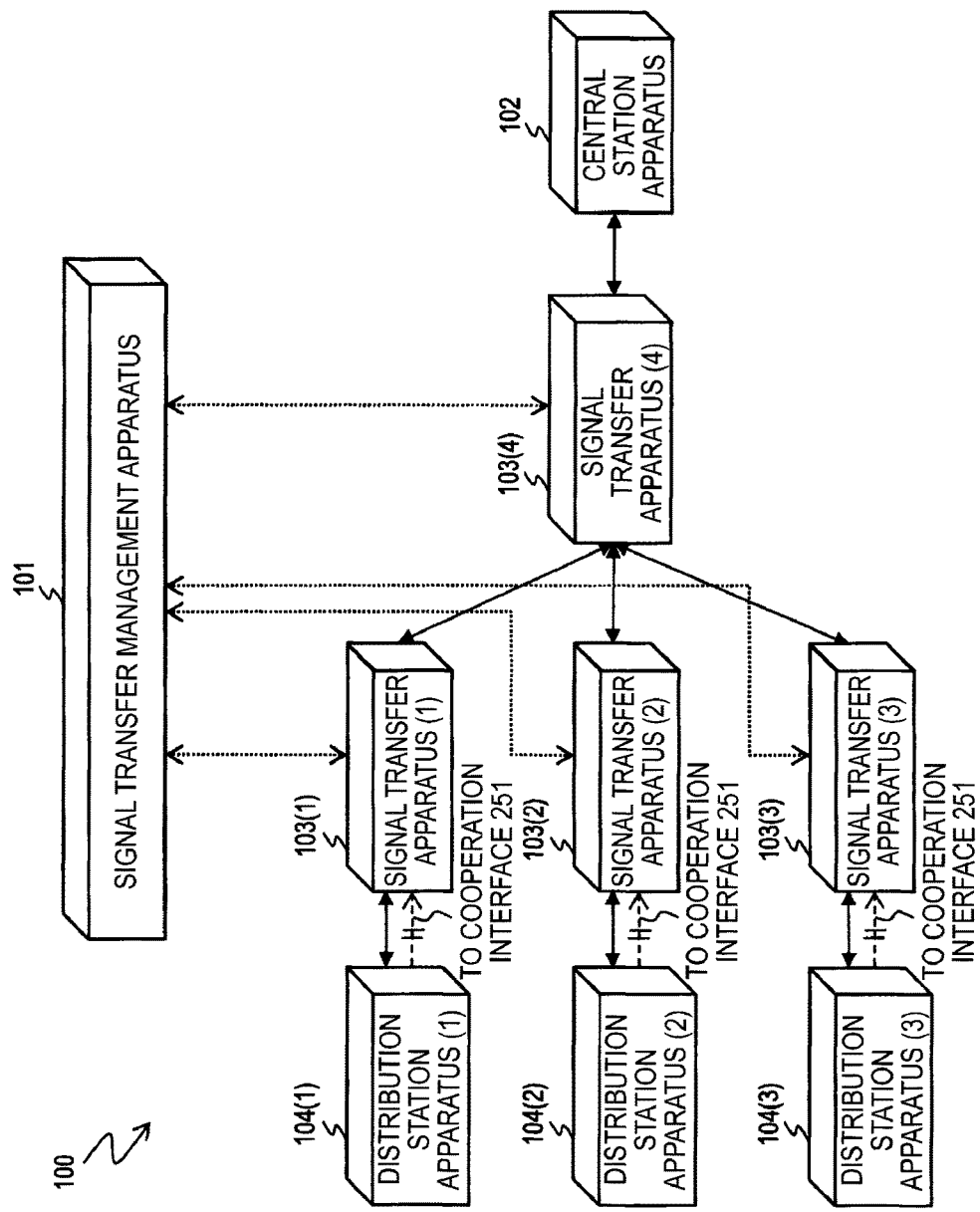
FIG. 1 is a diagram illustrating an exemplary configuration of a signal transfer system according to the present embodiment.

FIG. 1 illustrates an exemplary configuration of a signal transfer system 100 according to the present embodiment. In FIG. 1, the signal transfer system 100 includes a signal transfer management apparatus 101, a central station apparatus 102, a signal transfer apparatus 103(1), a signal transfer apparatus 103(2), a signal transfer apparatus 103(3), a signal transfer apparatus 103 (4), a distribution station apparatus 104(1), a distribution station apparatus 104(2), and a distribution station apparatus 104(3). Here, when a common description is given on the signal transfer apparatuses 103(1) to 103(4) in the following description, each will be referred to as a signal transfer apparatus 103 with "(number)" at the end of the reference sign omitted and the same applies to the distribution station apparatus 104(1) to 104(3).

In the signal transfer system 100 illustrated in FIG. 1, a plurality of signal transfer apparatuses 103 connected in multiple stages form an MBH network between a plurality of distribution station apparatuses 104 and a central station apparatus 102 in a wireless base station apparatus that is deployed separately over the distribution station apparatuses 104 and the central station apparatus 102.

The signal transfer apparatuses 103 are each equipped with a TAS function. In the following description, signals communicated between distribution station apparatuses 104 and the central station apparatus 102 are referred to as frames when it is specifically indicated, while signals and frames basically indicate the same.

As described in the related art, the TAS reserves a time slot for a frame with traffic with a high priority (a high priority frame) and opens a gate in the reserved time slot to transfer the high priority frame while closing gates of frames with other priorities, such that high priority frames are transferred preferentially.

In FIG. 1, the distribution station apparatuses 104(1), 104(2), and 104(3) wirelessly communicate with wireless terminals (such as, for example, mobile terminals or IoT terminals) and high priority frames of communication signals are aggregated in the central station apparatus 102 via the MBH network formed of the signal transfer apparatuses 103(1) to 103(4).

The central station apparatus 102 aggregates uplink signals from the plurality of distribution station apparatuses 104 via the MBH network and distributes downlink signals to the distribution station apparatuses 104 via the MBH network.

The signal transfer apparatuses 103 are apparatuses that transfer signals between the distribution station apparatuses 104 and the central station apparatus 102 and form the MBH network. Although the network of FIG. 1 is illustrated as a star-type network, the present embodiment can be similarly applied to a ring-type network, a mesh-type network, or the like.

Here, in the following description, one side of the plurality of signal transfer apparatuses 103 connected in multiple stages which is closer to the distribution station apparatuses 104 is referred to as a lower side and the other side which is closer to the central station apparatus 102 is referred to as an upper side. Further, in the direction in which a signal flows, a stage from which the signal is transmitted is referred to as a previous stage and another stage at which the signal is received is referred to as a next stage. For example, in the case of FIG. 1, the signal transfer apparatuses 103(1), 103(2), and 103(3) are each a signal transfer apparatus 103 on the lower side in the uplink direction from the distribution station apparatuses 104 to the central station apparatus 102 and are each a signal transfer apparatus 103 at the previous stage to the signal transfer apparatus 103(4). Similarly, the signal transfer apparatus 103(4) is a signal transfer apparatus 103 on the upper side and is a signal transfer apparatus 103 at the next stage to that of the signal transfer apparatuses 103(1), 103(2), and 103(3).

The example of FIG. 1 is provided with the signal transfer apparatuses 103(1), 103(2), and 103(3) on the lower side which are connected respectively to the distribution station apparatuses 104(1), 104(2), and 104(3) and the signal transfer apparatus 103(4) on the upper side that aggregates signals from the signal transfer apparatuses 103(1) to 103(3) and connects them to the central station apparatus 102. The signal transfer apparatuses 103(1), 103(2) and 103(3) are connected respectively to the distribution station apparatuses 104(1), 104(2) and 104(3) via dedicated cooperation interfaces (IFs) 251 and acquire mobile scheduling information from the distribution station apparatuses 104 through PUCCH signals. Here, the mobile scheduling information includes information regarding the transmission timing and the amount of data of each frame that will be transmitted from a distribution station apparatus 104 in the future. Each signal transfer apparatus 103 according to the present embodiment acquires mobile scheduling information including information on the transmission timing and the amount of data of a high priority frame that will be transmitted next from a distribution station apparatus 104 and transfers the acquired information to a signal transfer apparatus 103 on the upper side. Then, upon determining that there is a possibility that a microburst may occur according to the mobile scheduling information received from a plurality of signal transfer apparatuses 103 on the lower side, the signal transfer apparatus 103 on the upper side transmits timing adjustment requests instructing signal transfer apparatuses 103 on the lower side to adjust the timings of opening and closing gates (opening and closing timings), thereby preventing the occurrence of a microburst. Here, gates pass signals when they are open and blocks signals when they are closed. A timing adjustment request is control information for adjusting the opening and closing timings of gates. The opening timing of a gate of a priority corresponding to a signal that causes a microburst is shifted backward by a designated interval to delay the transmission timing of the signal. Here, the closing timing of the gate may be shifted backward by the designated interval or may remain unchanged without being shifted. The control information includes information on the designated interval and the designated interval corresponds to the amount of delay that will be described later.

In FIG. 1, the signal transfer management apparatus 101 determines paths through which signals are to be passed between the distribution station apparatuses 104 and the central station apparatus 102 in the network formed of the signal transfer apparatuses 103 and instructs each signal transfer apparatus 103 or instructs a scheduler unit 205 in each signal transfer apparatus 103.

As described above, in the signal transfer system 100 according to the present embodiment, mobile scheduling information that has been received from distribution station apparatuses 104 via cooperation interfaces 251 is transferred to signal transfer apparatuses 103 on the upper side, and upon determining that there is a possibility that a microburst may occur according to mobile scheduling information received from a plurality of signal transfer apparatuses 103 on the lower side, the signal transfer apparatus 103 on the upper side instructs signal transfer apparatuses 103 on the lower side to adjust the opening and closing timings of gates, whereby it is possible to prevent the occurrence of a microburst.

Figure 2:
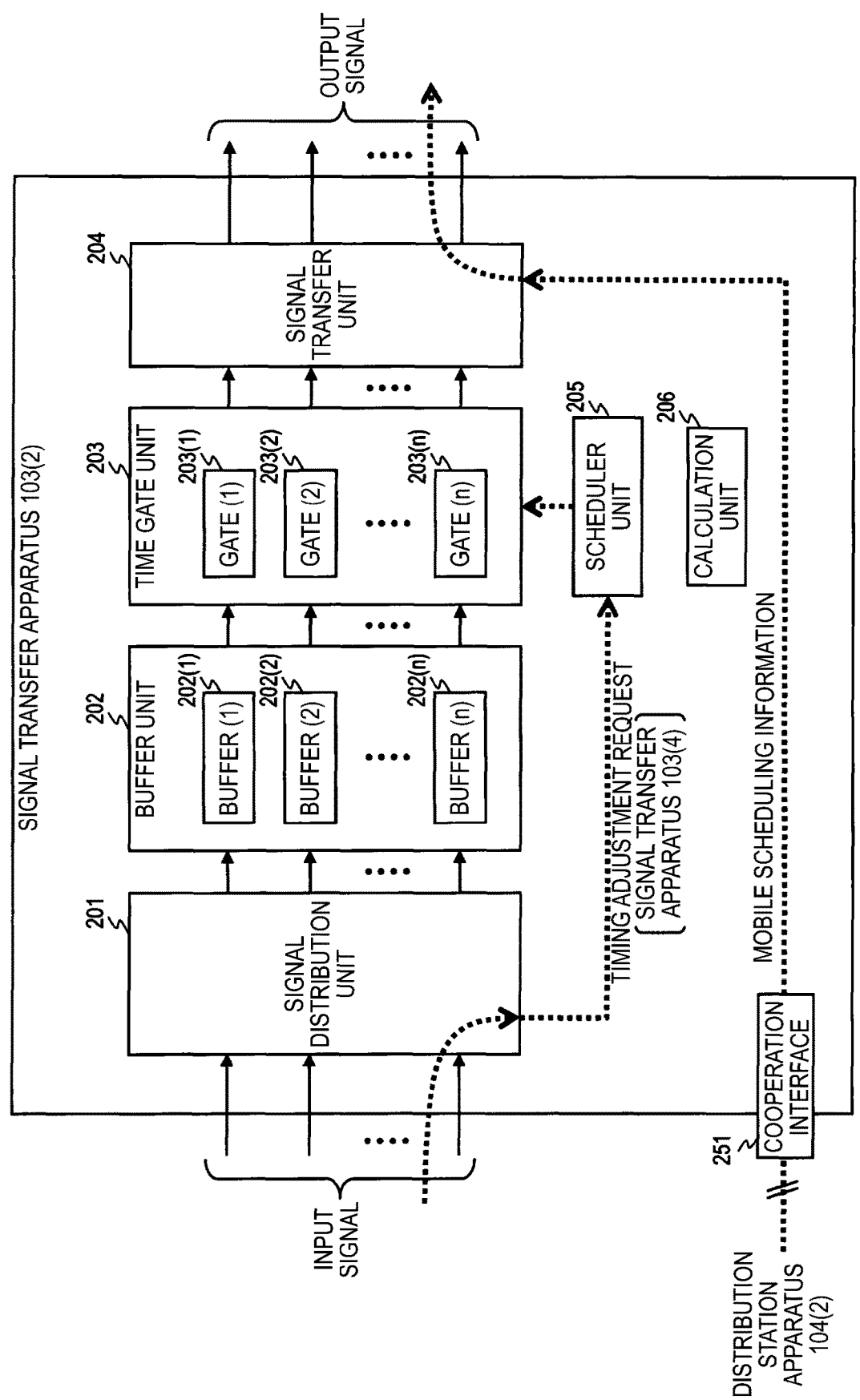
FIG. 2 is a diagram illustrating an exemplary configuration of a signal transfer apparatus that is directly connected to a distribution station apparatus.

FIG. 2 illustrates an exemplary configuration of the signal transfer apparatus 103(2) that is directly connected to the distribution station apparatus 104(2). Although the signal transfer apparatus 103(2) will be described with reference to FIG. 2, the same applies to the signal transfer apparatus 103(1) and the signal transfer apparatus 103(3) that are directly connected to distribution station apparatuses 104.

In FIG. 2, the signal transfer apparatus 103 includes a signal distribution unit 201, a buffer unit 202, a time gate unit 203, a signal transfer unit 204, a scheduler unit 205, a calculation unit 206, and a cooperation interface 251.

The signal distribution unit 201 has a function of distributing input signals to priority based buffers. For example, the signal distribution unit 201 distributes frames, which are received from a distribution station apparatus 104 or another signal transfer apparatus 103 when they are uplink or received from the central station apparatus 102 or another signal transfer apparatus 103 when they are downlink, based on priorities stored in their frame headers and outputs them to the buffer unit 202. In the present embodiment, the signal distribution unit 201 also receives control information such as mobile scheduling information and a timing adjustment request output from another signal transfer apparatus 103 and outputs the control information to the scheduler unit 205 and the like.

The buffer unit 202 is a buffer memory that temporarily holds high priority frames or low priority frames distributed by the signal distribution unit 201 according to their priorities. The buffer unit 202 includes a plurality of preset priority based buffers (such as, for example, high priority buffers and low priority buffers). In the example of FIG. 2, the buffer unit 202 includes n buffers 202(1), 202(2), . . . , and 202(n) (where n is a positive integer).

The time gate unit 203 includes a plurality of gates corresponding to the plurality of buffers of the buffer unit 202 and opens and closes the gates in response to commands from the scheduler unit 205. In the example of FIG. 2, the time gate unit 203 includes n gates 203(1), 203(2), . . . , 203(n). The time gate unit 203 controls opening and closing of the gates that output frames from the corresponding buffers in which the frames with corresponding priorities are held, for example, in response to commands from the scheduler unit 205.

The signal transfer unit 204 has a function of transferring frames output from the gates of the time gate unit 203 to output destinations designated based on commands from the signal transfer management apparatus 101 that will be described later. In the present embodiment, the signal transfer unit 204 also has a function of transferring control information such as mobile scheduling information and a timing adjustment request to another signal transfer apparatus 103 while transferring frames.

The scheduler unit 205 controls whether to transmit signals held in the buffers of the buffer unit 202 by opening and closing the gates of the time gate unit 203 based on preset scheduling information. Here, the scheduling information is information regarding gate start times, gate open durations, gate opening cycles, or the like of the gates of the time gate unit 203 for the frames held in the priority based buffers of the buffer unit 202. Here, in the present embodiment, the scheduling information of the scheduler unit 205 is adjusted based on a calculation result of the calculation unit 206. When the scheduling information is not adjusted, the scheduler unit 205 periodically opens and closes each gate at a gate start time, a gate open duration, and a gate opening cycle that are predetermined according to the priority. Here, in the present embodiment, information that is received from a distribution station apparatus 104 via the cooperation interface 251 is referred to as mobile scheduling information and information used by the scheduler unit 205 is referred to as scheduling information. In particular, in the present embodiment, the scheduler unit 205 receives control information on a timing adjustment request from an apparatus on the upper side such as a signal transfer apparatus 103 at the next or later stage or the central station apparatus 102 and adjusts the opening and closing timings of gates. For example, when there is a possibility that a microburst may occur at the signal transfer apparatus 103(4) on the upper side, a timing adjustment request is made to at least one or more of the signal transfer apparatuses 103(1) to 103(3) on the lower side. When a timing adjustment request is made to a plurality of signal transfer apparatuses 103, it is necessary to change the amount of delay requested to each signal transfer apparatus 103. Here, in a method of determining the amount of delay, it is necessary to increase the amount of delay as the amount of traffic increases and a correspondence table between the amount of traffic and the amount of delay may be created in advance and set in the scheduler unit 205. Alternatively, the amount of delay may be set as a sufficiently small initial value and the timing may then be adjusted little by little over a plurality of times until there is no discarded traffic or the amount of traffic becomes equal to or less than a threshold value. The occurrence of a microburst can be limited by making a timing adjustment request to signal transfer apparatuses 103 at the previous stage based on mobile scheduling information obtained from the cooperation interface 251 regarding the possibility of occurrence of a microburst as described above.

The calculation unit 206 operates when the signal transfer apparatus 103 has received mobile scheduling information from at least one or more signal transfer apparatuses 103 at the previous stage. In FIG. 2, the calculation unit 206 does not operate because the mobile scheduling information that the cooperation interface 251 has received from the distribution station apparatus 104(2) is transferred to the signal transfer apparatus 103(4) at the subsequent stage, skipping the calculation unit 206. However, the calculation unit 206 of the signal transfer apparatus 103(4) at the next stage that will be described with reference to FIG. 3 calculates a total amount of traffic that will be received in the future based on mobile scheduling received from the signal transfer apparatuses 103 at the previous stage (the signal transfer apparatuses 103(1) to 103(3)), and upon determining that the total amount of traffic exceeds the transfer capacity and there is a possibility that a microburst may occur, transmits a timing adjustment request to each signal transfer apparatus 103 at the previous stage.

The cooperation interface 251 is a dedicated interface between the distribution station apparatus 104(2) and the signal transfer apparatuses 103(2) on the lower side connected to the distribution station apparatus 104(2), and the signal transfer apparatus 103(2) receives mobile scheduling information from the distribution station apparatus 104(2) via the cooperation interface 251. In the present embodiment, the mobile scheduling information that has been received from the distribution station apparatus 104(2) is transferred to the signal transfer apparatus 103(4) at the next stage.

In this way, signal transfer apparatuses 103 directly connected to distribution station apparatuses 104 transfer mobile scheduling information that has been received from the distribution station apparatuses 104 via cooperation interfaces 251 to a signal transfer apparatus 103 on the upper side. Then, upon determining that there is a possibility that a microburst may occur according to mobile scheduling information received from a plurality of signal transfer apparatuses 103 on the lower side, the signal transfer apparatus 103 on the upper side instructs signal transfer apparatuses 103 on the lower side to adjust the opening and closing timings of gates, whereby it is possible to prevent the occurrence of a microburst.

Here, a method of transmitting control information when signal transfer apparatuses 103 are connected in multiple stages will be described.

(1) Mobile scheduling information is transmitted from the lower side (the distribution station apparatus 104 side) to the upper side (the central station apparatus 102 side), and a signal transfer apparatus 103 on the upper side calculates the signal transmission timing of each signal transfer apparatus 103 on the lower side based on mobile scheduling information aggregated from the lower side and transmits control information on a timing adjustment request to each signal transfer apparatus 103.

(2) Mobile scheduling information is transferred to a signal transfer apparatus 103 at a merging point (at each merging point if there are a plurality of merging points) in a path from the lower side (the distribution station apparatus 104 side) to the upper side (the central station apparatus 102 side), and the signal transfer apparatus 103 at the merging point calculates the signal transmission timing of each signal transfer apparatus 103 on the lower side based on aggregated mobile scheduling information and transmits control information on a timing adjustment request to the central station apparatus 102. Then, the central station apparatus 102 calculates the signal transmission timing of each signal transfer apparatus 103 based on information from each merging point and transmits control information on a timing adjustment request to each signal transfer apparatus 103.

As described above, in the signal transfer system 100 according to the present embodiment, a signal transfer apparatus 103 on the upper side or the central station apparatus 102 calculates the signal transmission timing of each signal transfer apparatus 103 on the lower side and transmits control information on a timing adjustment request to each signal transfer apparatus 103, whereby it is possible to prevent the occurrence of the microburst.

Here, it is assumed that, when there are a plurality of signal transfer apparatuses 103 at the previous stage, a timing adjustment request is transmitted to at least one or more of the signal transfer apparatuses 103.

Figure 3:
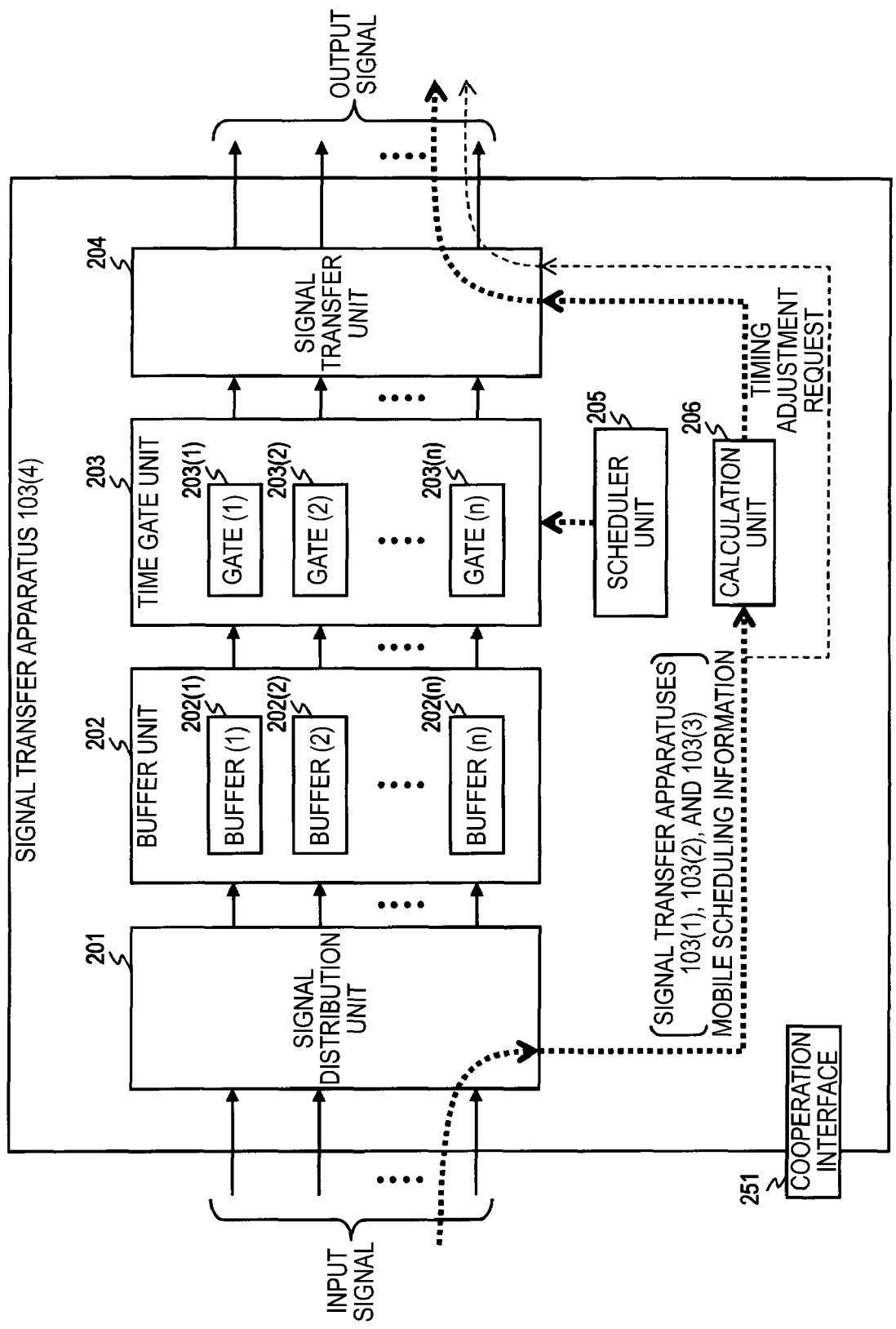
FIG. 3 is a diagram illustrating an exemplary configuration of a signal transfer apparatus that is not directly connected to a distribution station apparatus.

FIG. 3 illustrates an exemplary configuration of the signal transfer apparatus 103(4) that is not directly connected to a distribution station apparatus 104. In FIG. 3, the basic configuration of the signal transfer apparatus 103(4) is the same as that of the signal transfer apparatus 103 described with reference to FIG. 2. Although an example of the signal transfer apparatus 103(4) is illustrated in FIG. 3, the same is true when there is a signal transfer apparatus 103 at the next or later stage that is not directly connected to a distribution station apparatus 104 among the signal transfer apparatuses 103 connected in multiple stages.

In the signal transfer apparatus 103(4), a signal distribution unit 201 outputs mobile scheduling information received from signal transfer apparatuses 103 at the previous stage to a calculation unit 206. Specifically, the signal transfer apparatus 103(4) receives mobile scheduling information transferred from the signal transfer apparatuses 103

(1) to 103(3) and outputs the received mobile scheduling information to the calculation unit 206. Here, the signal transfer apparatus 103(4) inputs the mobile scheduling information to the calculation unit 206, and when there is a signal transfer apparatus 103 at the next stage to that of the signal transfer apparatus 103(4) (when there is another signal transfer apparatus 103 between the signal transfer apparatus 103(4) and the central station apparatus 102 in the example of FIG. 1), may transfer the mobile scheduling information to the signal transfer apparatus 103 at the next stage through a signal transfer unit 204. Alternatively, the signal transfer apparatus 103(4) may transfer the mobile scheduling information to the central station apparatus 102. In the example of FIG. 3, a cooperation interface 251 of the signal transfer apparatus 103(4) is not connected to any of the distribution station apparatuses 104.

The calculation unit 206 in the signal transfer apparatus 103 receives mobile scheduling information from at least one signal transfer apparatus 103 at the previous stage. Then, the calculation unit 206 calculates a total amount of traffic that will be received in the future based on the mobile scheduling information, and upon determining that the total amount of traffic exceeds the transfer capacity and there is a possibility that a microburst may occur, transmits a timing adjustment request to signal transfer apparatuses 103 at the previous stage.

As described above, the signal transfer apparatus 103(4) on the upper side that is not directly connected to a distribution station apparatus 104 calculates a total amount of traffic that will be received in the future based on mobile scheduling information received from signal transfer apparatuses 103 on the lower side that are directly connected to distribution station apparatuses 104. Then, upon determining that the total amount of traffic exceeds the transfer capacity and there is a possibility that a microburst may occur, the signal transfer apparatus 103(4) on the upper side transmits a timing adjustment request to signal transfer apparatuses 103 on the lower side, such that it is possible to prevent the occurrence of a microburst.

Comparative Example

Figure 4:
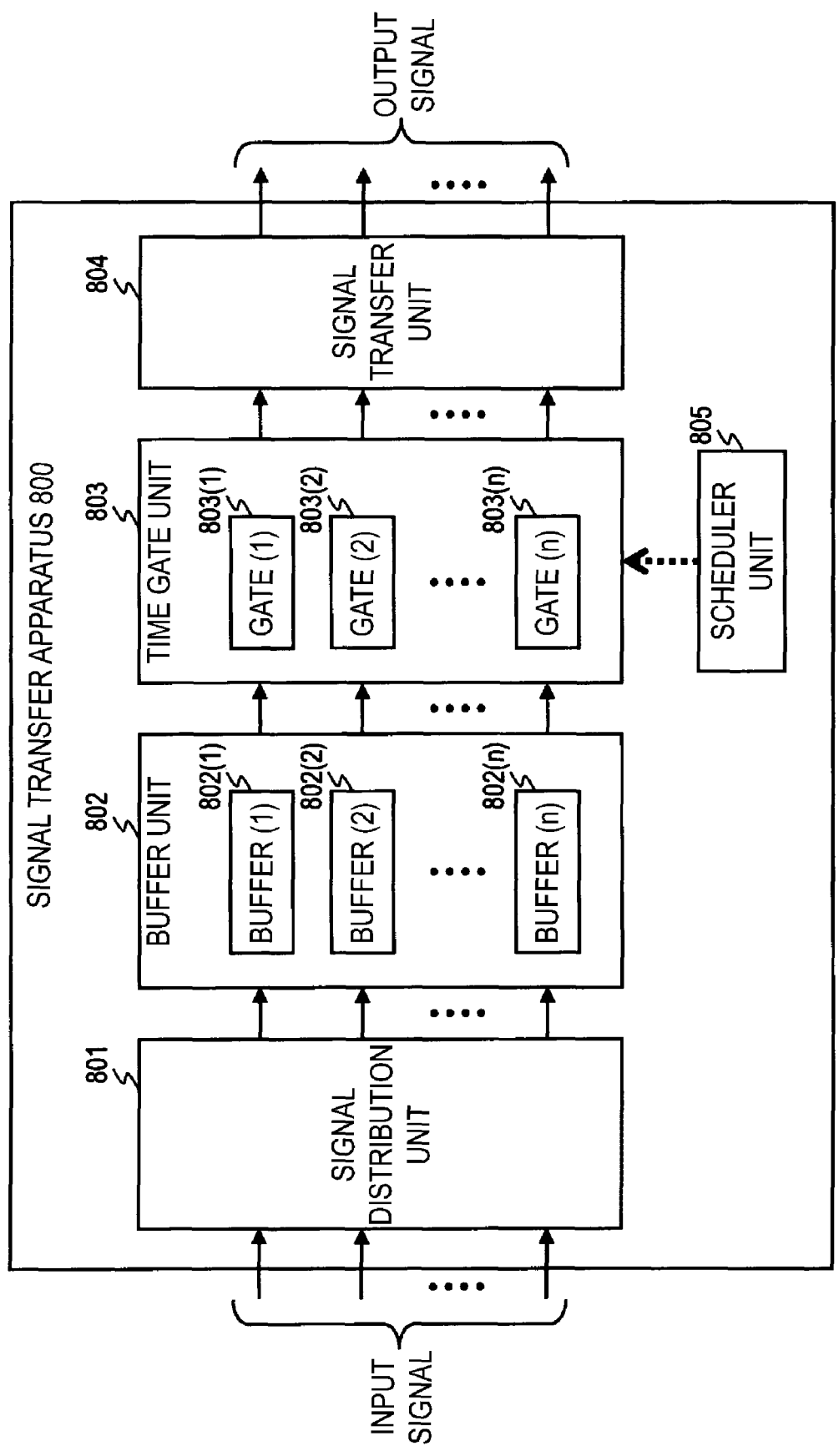
FIG. 4 is a diagram illustrating an exemplary configuration of a signal transfer apparatus of a comparative example.

FIG. 4 illustrates an exemplary configuration of a signal transfer apparatus 800 of a comparative example. In FIG. 4, the signal transfer apparatus 800 includes a signal distribution unit 801, a buffer unit 802, a time gate unit 803, a signal transfer unit 804, and a scheduler unit 805. The signal transfer apparatus 800 has a TAS function and controls the opening and closing of each gate according to the priority.

Similar to the signal distribution unit 201 according to the present embodiment, the signal distribution unit 801 has a function of distributing input signals to priority based buffers.

Similar to the buffer unit 202 according to the present embodiment, the buffer unit 802 is a buffer memory that temporarily holds high priority frames or low priority frames distributed by the signal distribution unit 801 according to their priorities. In the example of FIG. 3, the buffer unit 802 has n buffers 802(1), 802(2), . . . , 802(n).

Similar to the time gate unit 203 according to the present embodiment, the time gate unit 803 includes a plurality of gates corresponding to the plurality of buffers of the buffer unit 802 and opens and closes the gates in response to commands from the scheduler unit 805. In the example of FIG. 3, the time gate unit 803 has n gates 803(1), 803(2), . . . , 803(n).

The signal transfer unit 804 has a function of transferring frames output from the gates of the time gate unit 803 to output destinations designated by the signal transfer management apparatus 101.

The scheduler unit 805 periodically opens and closes each gate at the gate start time, the gate open duration, and the gate opening cycle according to the priority based on predetermined scheduling information and preferentially transfers a frame with the priority of the opened gate.

Thus, through the TAS function, the signal transfer apparatus 800 reserves a time slot for a high priority frame and opens a gate in the reserved time slot to transfer the high priority frame while closing the gates of other priority frames, such that high priority frames can be transferred preferentially. However, in the comparative example, simultaneously with the completion of transmission of a frame that is desired to be prioritized in control, the gate of a frame of another priority is opened and therefore if this occurs simultaneously at signal transfer apparatuses 800 at multiple locations, frames of other priorities will simultaneously arrive at a signal transfer apparatus 800 on the upper side, such that there is a possibility that a microburst may occur. Similarly, at the time of occurrence of transmission of a signal that is desired to be prioritized in control, the gate of the signal that is desired to be prioritized is opened, but if this occurs simultaneously at signal transfer apparatuses at multiple locations, signals that are desired to be prioritized will simultaneously arrive at a signal transfer apparatus at the next stage where signals of a plurality of signal transfer apparatuses merge, such that there is a possibility that a microburst may occur.

On the other hand, the signal transfer system, the signal transfer apparatus, the signal transfer method, and the signal transfer program according to the present invention can prevent the occurrence of a microburst because, upon determining that there is a possibility that a microburst may occur according to mobile scheduling information received from a plurality of signal transfer apparatuses on the lower side, a signal transfer apparatus on the upper side instructs signal transfer apparatuses on the lower side to adjust the opening and closing timings of gates as described in the above embodiment.

Although the above embodiment has been described assuming that it is applied to MBH, it can also be applied to MFH. In the case of MFH, the distribution station apparatuses are replaced with wireless apparatuses and the central station apparatus is replaced with a wireless control apparatus, and the wireless apparatuses and the wireless control apparatus share and execute the functions of one base station.

Here, each signal transfer apparatus 103 according to the present embodiment has been described with reference to apparatuses with blocks illustrated in FIGS. 2 and 3, but it can also be realized by a computer that executes a program of a signal transfer method corresponding to processing performed by each block. The program may be recorded on a recording medium to be provided or may be provided through a network.

REFERENCE SIGNS LIST

100 Signal transfer system
101 Signal transfer management apparatus
102 Central station apparatus
103, 800 Signal transfer apparatus
104 Distribution station apparatus
201, 801 Signal distribution unit 202, 802 Buffer unit
203, 803 Time gate unit
204, 804 Signal transfer unit
205, 805 Scheduler unit
206 Calculation unit
251 Cooperation interface

The invention claimed is:

1. A signal transfer system comprising:
a distribution station apparatus corresponding to a wireless base station apparatus;
a central station apparatus configured to centrally control the wireless base station apparatus;
a plurality of signal transfer apparatuses connected in multiple stages and forming a network between the distribution station apparatus and the central station apparatus; and
a signal transfer management apparatus configured to control the plurality of signal transfer apparatuses, wherein
a signal transfer apparatus on an upper side among the plurality of signal transfer apparatuses is configured to determine a total amount of network traffic according to mobile scheduling information received from the plurality of signal transfer apparatuses on a lower side and, in response to determining that the total amount of network traffic exceeds transfer capacity of the plurality of signal transfer apparatuses, to transmit a timing adjustment request to at least one of a plurality of signal transfer apparatuses on a lower side among the plurality of signal transfer apparatuses, where the signal transfer apparatus on the upper side is located proximate to the central station apparatus and signal transfer apparatuses on the lower side are located proximate to the distribution station apparatus, and
the signal transfer apparatus on the lower side that has received the timing adjustment request from the signal transfer apparatus on the upper side is configured to adjust opening and closing timings of a gate using a time aware shaper function and based on the timing adjustment request.

2. The signal transfer system according to claim 1, wherein
the timing adjustment request is control information for shifting an opening interval of a gate of a priority signal other than a high priority signal backward by a designated interval to delay a transmission timing of the other priority signal or control information for shifting an opening interval of a gate of the high priority signal backward by a designated interval to delay a transmission timing of the high priority signal.

3. A signal transfer apparatus forming a network between a distribution station apparatus corresponding to a wireless base station apparatus, a central station apparatus configured to centrally control the wireless base station apparatus, the distribution station apparatus, and the central station apparatus, the signal transfer apparatus comprising:
a signal distribution unit configured to distribute received signals to priority based buffers;
a time gate unit configured to open and close gates for the signals of the buffers according to a command from a scheduler unit;
a signal transfer unit configured to transfer frames output from the gates of the time gate unit to designated output destinations;
a calculation unit configured to, when the signal transfer apparatus is a signal transfer apparatus on an upper side, determine a total amount of network traffic according to mobile scheduling information received from the plurality of signal transfer apparatuses on a lower side and, in response to determining that the total amount of network traffic exceeds transfer capacity of the plurality of signal transfer apparatuses, transmit a timing adjustment request to at least one of a plurality of the signal transfer apparatuses on a lower side, where the signal transfer apparatus on the upper side is located proximate to the central station apparatus and the signal transfer apparatuses on the lower side are located proximate to the distribution station apparatus; and
the scheduler unit configured to, when the signal transfer apparatus is a signal transfer apparatus on the lower side, adjust opening and closing timings of the gates based on the timing adjustment request received from the signal transfer apparatus on the upper side.

4. The signal transfer apparatus according to claim 3, wherein
the timing adjustment request is control information for shifting an opening interval of a gate of a priority signal other than a high priority signal backward by a designated interval to delay a transmission timing of the other priority signal or control information for shifting an opening interval of a gate of the high priority signal backward by a designated interval to delay a transmission timing of the high priority signal.

5. A signal transfer method for a signal transfer system including a distribution station apparatus corresponding to a wireless base station apparatus, a central station apparatus configured to centrally control the wireless base station apparatus, a plurality of signal transfer apparatuses connected in multiple stages and forming a network between the distribution station apparatus and the central station apparatus, and a signal transfer management apparatus configured to control the plurality of signal transfer apparatuses, the signal transfer method comprising:
by a signal transfer apparatus on an upper side among the plurality of signal transfer apparatuses, determining a total amount of network traffic according to mobile scheduling information received from the plurality of signal transfer apparatuses on a lower side and, in response to determining that the total amount of network traffic exceeds transfer capacity of the plurality of signal transfer apparatuses, transmitting a timing adjustment request to at least one of a plurality of signal transfer apparatuses on a lower side among the plurality of signal transfer apparatuses, where the signal transfer apparatus on the upper side is located proximate to the central station apparatus and signal transfer apparatuses on the lower side are located proximate to the distribution station apparatus, and
by the signal transfer apparatus on the lower side that has received the timing adjustment request from the signal transfer apparatus on the upper side, adjusting opening and closing timings of a gate using a time aware shaper function and based on the timing adjustment request.

6. The signal transfer method according to claim 5, wherein
the timing adjustment request is control information for shifting an opening interval of a gate of a priority signal other than a high priority signal backward by a designated interval to delay a transmission timing of the other priority signal or control information for shifting an opening interval of a gate of the high priority signal backward by a designated interval to delay a transmission timing of the high priority signal.

7. A non-transitory computer-readable medium having computer-executable instructions that, upon execution of the instructions by a processor of a computer, cause the computer to function as the signal transfer method according to claim 5.

* * * * *